US 11,444,962 B2

(12) United States Patent
Crume

(10) Patent No.: US 11,444,962 B2
(45) Date of Patent: Sep. 13, 2022

(54) DETECTION OF AND DEFENSE AGAINST PASSWORD SPRAYING ATTACKS

(71) Applicant: International Business Machines Corporation, Armonk, NY (US)

(72) Inventor: Jeffery Lake Crume, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 16/782,606

(22) Filed: Feb. 5, 2020

(65) Prior Publication Data

US 2021/0243207 A1 Aug. 5, 2021

(51) Int. Cl.
*H04L 9/40* (2022.01)
*G06F 16/22* (2019.01)
*G06F 21/46* (2013.01)

(52) U.S. Cl.
CPC ...... *H04L 63/1416* (2013.01); *G06F 16/2255* (2019.01); *G06F 21/46* (2013.01)

(58) Field of Classification Search
CPC ... H04L 63/1416; G06F 16/2255; G06F 21/46
See application file for complete search history.

(56) References Cited

U.S. PATENT DOCUMENTS

| | | | |
|---|---|---|---|
| 5,495,235 A | 2/1996 | Durinovic-Johri et al. | |
| 7,159,149 B2 | 1/2007 | Spiegel et al. | |
| 7,523,499 B2 | 4/2009 | Wilkins et al. | |
| 9,172,715 B2 | 10/2015 | Mahadik et al. | |
| 9,514,294 B1 * | 12/2016 | Hepburn | H04L 63/0281 |
| 9,942,220 B2 | 4/2018 | Bajenov et al. | |
| 10,200,385 B2 | 2/2019 | Rook | |
| 10,320,848 B2 | 6/2019 | Kerametlian et al. | |
| 11,269,978 B2 * | 3/2022 | Cohen | G06F 21/55 |
| 2003/0101359 A1 | 5/2003 | Achen et al. | |

(Continued)

OTHER PUBLICATIONS

Ero et al., "Password spraying detection: Where do I start?," Security Blog, Okta, Inc. Mar. 25, 2019, accessed Feb. 5, 2020, 8 pages. https://www.okta.com/security-blog/2019/03/password-spraying-detection-where-to-start/.

(Continued)

*Primary Examiner* — James R Turchen
(74) *Attorney, Agent, or Firm* — Yee & Associates, P.C.

(57) ABSTRACT

Detecting and defending against password spraying attacks is provided. Information is received regarding failed attempts to login to user accounts located on a target system of a network. Each password used to attempt a failed login to any of the user accounts located on the target system is recorded. It is determined whether a common password is used in a failed login attempt to a number of different user accounts located on the target system greater than or equal to a predetermined threshold. In response to determining that the common password was used in the failed login attempt to the number of different user accounts on the target system greater than or equal to the predetermined threshold, an alert is sent regarding a password spraying attack corresponding to the common password that resulted in the failed login attempt to the number of different user accounts located on the target system.

14 Claims, 5 Drawing Sheets

(56) References Cited

U.S. PATENT DOCUMENTS

| | | | |
|---|---|---|---|
| 2005/0216955 A1* | 9/2005 | Wilkins | H04L 63/1408 |
| | | | 726/23 |
| 2016/0359863 A1* | 12/2016 | Krstic | G06F 21/42 |
| 2017/0214712 A1* | 7/2017 | Maxwell | G06F 21/46 |
| 2017/0359372 A1* | 12/2017 | Ronen | H04L 63/1416 |
| 2018/0091530 A1* | 3/2018 | Rook | H04L 63/1416 |
| 2020/0267178 A1* | 8/2020 | Maor | H04L 63/1425 |
| 2021/0203675 A1* | 7/2021 | Kaidi | G06F 21/46 |
| 2021/0349979 A1* | 11/2021 | Cohen | G06F 21/552 |

OTHER PUBLICATIONS

Metcalf, "Trimarc Research: Detecting Password Spraying with Security Event Auditing," Trimarc, May 6, 2018, accessed Feb. 5, 2020, 7 pages. https://www.trimarcsecurity.com/post/2018/05/06/trimarc-research-detecting-password-spraying-with-security-event-auditing.

* cited by examiner

DETECTION OF AND DEFENSE AGAINST PASSWORD SPRAYING ATTACKS

BACKGROUND

1. Field

The disclosure relates generally to network security and more specifically to detecting and defending against password spraying attacks on a network.

2. Description of the Related Art

Password spraying is an attack that attempts to access a large number of accounts (e.g., usernames) with a commonly used password. As the name implies, a malicious actor is attempting to login to many accounts (i.e., "spraying"), hoping that one of the username/password combinations will work. For password spraying attacks, the malicious actor collects multiple user account identifiers using, for example, social engineering or other phishing methods.

Traditional brute-force attacks attempt to gain unauthorized access to a single account by guessing the password. This can result in a targeted account getting locked-out, as commonly used account-lockout policies allow for a limited number of failed attempts, such as, for example, three to five failed attempts. During a password spraying attack, the malicious actor attempts a single commonly used password, such as, for example, "Password1", against many accounts before moving on to attempt a second password, and so on. This technique allows the malicious actor to remain undetected by avoiding rapid or frequent account lockouts. If successful, the malicious actor may gain unauthorized access to one or more accounts from where the malicious actor can further penetrate into the network.

SUMMARY

According to one illustrative embodiment, a computer-implemented method for detecting and defending against password spraying attacks on a network is provided. Information is received regarding failed attempts to login to user accounts located on a target system of the network. Each password used to attempt a failed login to any of the user accounts located on the target system is recorded. It is determined whether a common password is used in a failed login attempt to a number of different user accounts located on the target system greater than or equal to a predetermined threshold. In response to determining that the common password was used in the failed login attempt to the number of different user accounts on the target system greater than or equal to the predetermined threshold, an alert is sent regarding a password spraying attack corresponding to the common password that resulted in the failed login attempt to the number of different user accounts located on the target system. According to other illustrative embodiments, a computer system and computer program product for detecting and defending against password spraying attacks on a network are provided.

DETAILED DESCRIPTION

Figure 1:
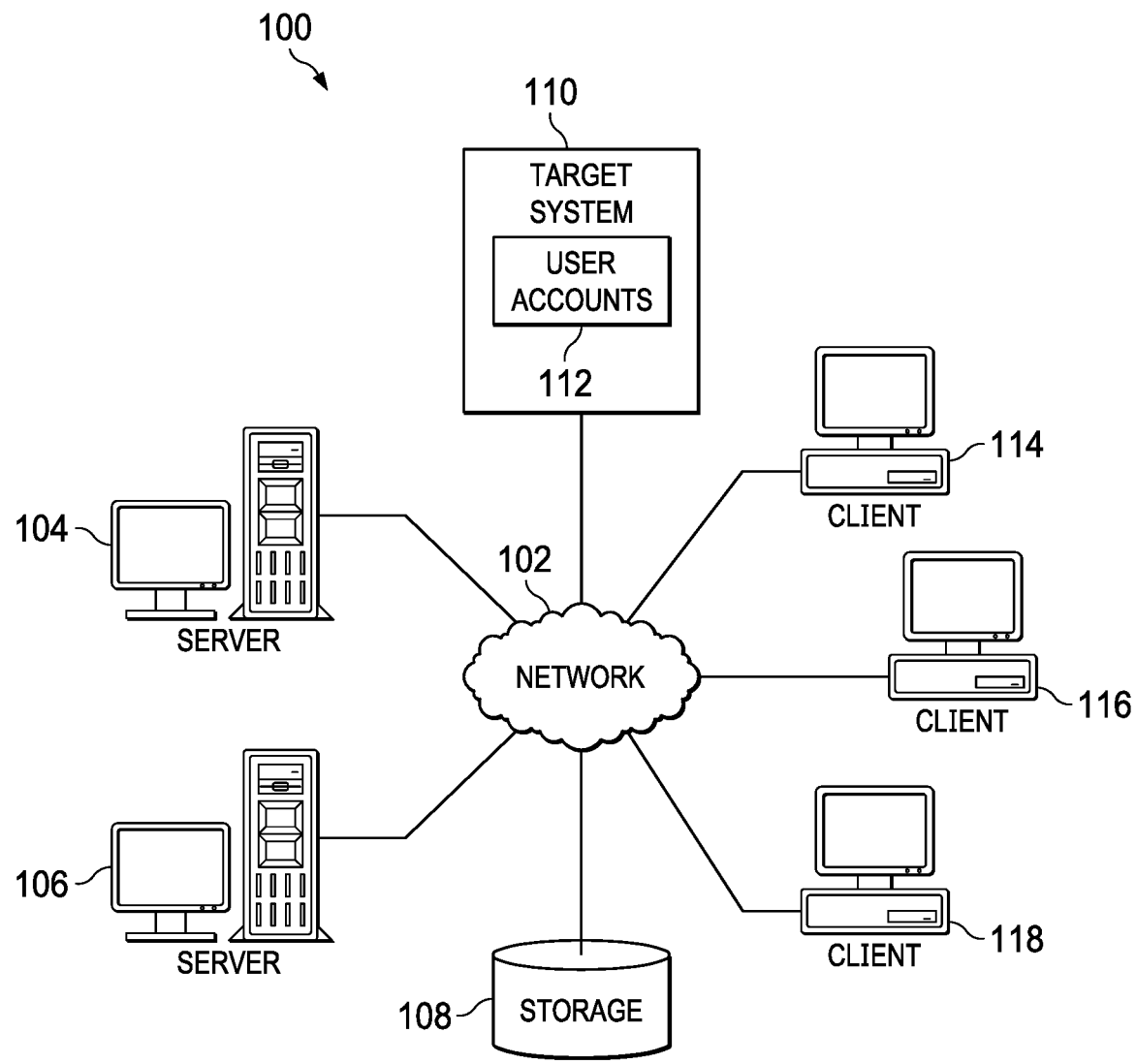
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
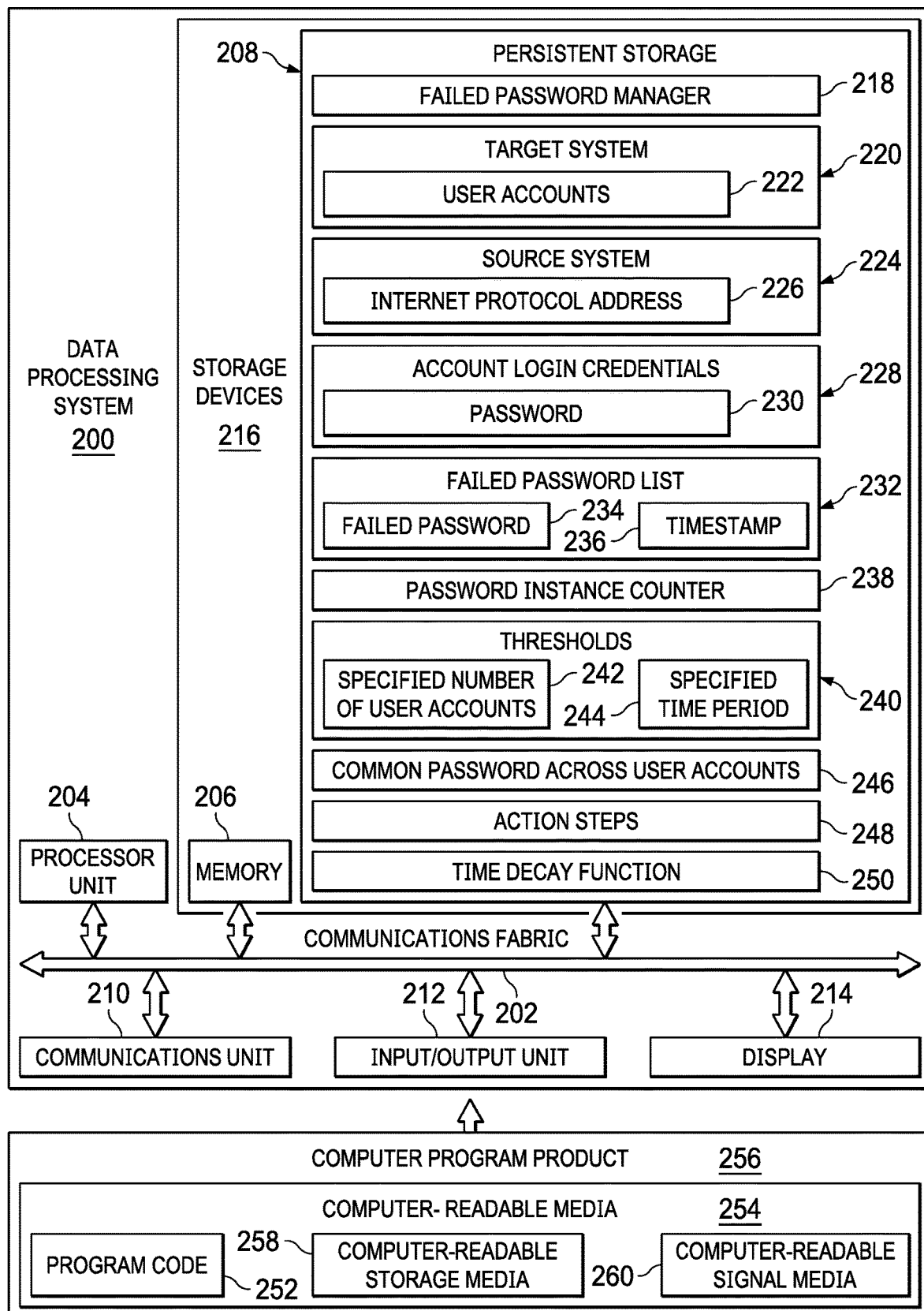
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 provide security services for computer systems connected to network 102. For example, server 104 and server 106 detect and defend against password spraying attacks by monitoring a number of failed login attempts using a common password within a specified time period against a specified number of user accounts located on a target system, such as target system 110. Also, it should be noted that server 104 and server 106 may each represent a cluster of servers in one or more data centers. Alternatively, server 104 and server 106 may each represent multiple computing nodes in one or more cloud environments.

Target system 110 represents a set of one or more computers that may be targets of a password spraying attack. Further, target system 110 may represent a plurality of different computer systems connected to network 102 that also may be targets of password spraying attacks. Target system 110 includes user accounts 112. User accounts 112 represent a plurality of different secure user accounts corresponding to a plurality of different users. A secure user account is a restricted account that requires valid credentials, such as, for example, a valid username and password combination, to authorize access. User accounts 112 may represent secure banking accounts, secure personal health records accounts, secure financial accounts, secure entertainment accounts, secure governmental accounts, secure business accounts, secure educational accounts, or the like.

Client 114, client 116, and client 118 also connect to network 102. Clients 114, 116, and 118 are clients of target system 110. In this example, clients 114, 116, and 118 are shown as desktop or personal computers with wire communication links to network 102. However, it should be noted that clients 114, 116, and 118 are examples only and may represent other types of data processing systems, such as, for example, network computers, laptop computers, handheld computers, smart phones, smart televisions, gaming devices, kiosks, and the like, with wire or wireless communication links to network 102. Users of clients 114, 116, and 118 may utilize clients 114, 116, and 118 to access their corresponding user accounts located on target system 110 using valid login credentials. However, a malicious user may utilize one or more of clients 114, 116, and 118 to perform a password spraying attack against all or a portion of user accounts 112 located on target system 110 using a common or same password in the hope of gaining access to one or more of user accounts 112.

Storage 108 is a network storage device capable of storing any type of data in a structured format or an unstructured format. In addition, storage 108 may represent a plurality of network storage devices. Further, storage 108 may store identifiers and network addresses for a plurality of different computer systems, identifiers and network addresses for a plurality of different client devices, identifiers for a plurality of different client device users, and the like. Furthermore, storage 108 may store other types of data, such as authentication or credential data that may include usernames, passwords, and biometric data associated with client device users and security analysts, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to target system 110 over network 102 for use on target system 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis or a persistent basis. Further, a computer readable storage device excludes a propagation medium. Memory 206, in these examples, may be, for example, a random-access memory (RAM), or any other suitable volatile or non-volatile storage device, such as a flash memory. Persistent storage 208 may take various forms, depending on the particular implementation.

For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores failed password manager 218. However, it should be noted that even though failed password manager 218 is illustrated as residing in persistent storage 208, in an alternative illustrative embodiment failed password manager 218 may be a separate component of data processing system 200. For example, failed password manager 218 may be a hardware component coupled to communication fabric 202 or a combination of hardware and software components. In another alternative illustrative embodiment, a first set of components of failed password manager 218 may be located in data processing system 200 and a second set of components of failed password manager 218 may be located in a second data processing system, such as, for example, server 106 in FIG. 1.

Failed password manager 218 controls the process of detecting and defending against password spraying attacks on target system 220. Target system 220 represents an identifier of a computer system that is protected by failed password manager 218. Also, target system 220 may represent identifiers for a plurality of different computer systems protected by failed password manager 218. Target system 220 may be, for example, target system 110 in FIG. 1. Target system 220 contains user accounts 222, such as user accounts 112 in FIG. 1. User accounts 222 represent identifiers for a plurality of user accounts located on target system 220.

Source system 224 represents an identifier, such as internet protocol address 226, of a source of a login request to access one or more of user accounts 222 located on target system 220. Source system 224 may include one or more devices, such as, for example, one or more of clients 114, 116, and 118 of FIG. 1. The login request from source system 224 comprises account login credentials 228, which includes password 230.

Failed password manager 218 checks whether account login credentials 228 are valid or correct by comparing account login credentials 228 with stored account login credentials corresponding to the user accounts that source system 224 has requested access to. If failed password manager 218 determines that account login credentials 228 are valid based on the comparison, then failed password manager 218 allows the login. However, if failed password manager 218 determines that account login credentials 228 are invalid based on the comparison, then failed password manager 218 rejects the login.

Furthermore, failed password manager 218 places password 230 associate with the failed login attempt in failed password list 232 as failed password 234. In addition, failed password manager 218 records timestamp 236 with failed password 234. Timestamp 236 represents a current timestamp associated with the failed login attempt.

Moreover, failed password manager 218 utilizes password instance counter 238 to maintain a count of each failed password used across user accounts 222 located on target system 220. Furthermore, failed password manager 218 also utilizes thresholds 240 to determine whether a password spraying attack is occurring against user accounts 222 located on target system 220. Thresholds 240 include specified number of user accounts 242 and specified time period 244. Specified number of user accounts 242 represents a predetermined minimum number of user accounts in user accounts 222 that needs to be exceeded prior to determining that a password spraying attack is occurring. Specified time period 244 represents a predetermined interval of time within which specified number of user accounts 242 must be exceeded prior to determining that a password spraying attack is occurring.

Common password across user accounts 246 represents identification of a same password that is being used in the password spraying attack to gain access to one or more of user accounts 222 based on password instance counter 238 and thresholds 240 being exceeded. Failed password manager 218 performs action steps 248 in response to determining that a password spraying attack is currently occurring. Action steps 248 represents a set of one or more steps that failed password manager 218 performs to mitigate the effect of the password spraying attack. Action steps 248 may include, for example, sending a notification to alert a security or system analyst regarding the attack, blocking login attempts to any of user accounts 222 located on target system 220 from an internet protocol address of the source system (e.g., internet protocol address 226 of source system 224), and disabling one or more of user accounts 222 for which common password across user accounts 246 resulted in the failed login attempt to specified number of user accounts 242 within specified time period 244.

Failed password manager 218 utilizes time decay function 250 to remove failed passwords from failed password list 232 after expiration of a defined period of time since the last time those passwords were used in failed login attempts. Time decay function 250 may utilize any defined period of time, such as, for example, one month, six months, one year, or any other period of time, to remove failed passwords from failed password list 232.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth© technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 252 is located in a functional form on computer readable media 254 that is selectively removable and may be loaded onto or transferred to data processing system 200 for running by processor unit 204. Program code 252 and computer readable media 254 form computer program product 256. In one example, computer readable media 254 may be computer readable storage media 258 or computer readable signal media 260.

In these illustrative examples, computer readable storage media 258 is a physical or tangible storage device used to store program code 252 rather than a medium that propagates or transmits program code 252. Computer readable storage media 258 may include, for example, an optical or magnetic disc that is inserted or placed into a drive or other device that is part of persistent storage 208 for transfer onto a storage device, such as a hard drive, that is part of persistent storage 208. Computer readable storage media 258 also may take the form of a persistent storage, such as a hard drive, a thumb drive, or a flash memory that is connected to data processing system 200.

Alternatively, program code 252 may be transferred to data processing system 200 using computer readable signal media 260. Computer readable signal media 260 may be, for example, a propagated data signal containing program code 252. For example, computer readable signal media 260 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer readable media 254" can be singular or plural. For example, program code 252 can be located in computer readable media 254 in the form of a single storage device or system. In another example, program code 252 can be located in computer readable media 254 that is distributed in multiple data processing systems. In other words, some instructions in program code 252 can be located in one data processing system while other instructions in program code 252 can be located in one or more other data processing systems. For example, a portion of program code 252 can be located in computer readable media 254 in a server computer while another portion of program code 252 can be located in computer readable media 254 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 252.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Password spraying is an attack in which the attacker attempts to log in to a range of user accounts using common passwords. It is analogous to using the same key to see if it happens to open any door among thousands. Password spraying succeeds because many users tend to use the same, weak passwords, many of those users also tend to use those same, weak passwords across multiple accounts, and attempting to log in to multiple accounts over time (rather than attempting multiple logins to the same account in a burst) is less likely to be detected and result in account lock out.

Current solutions focus on limiting the number of login attempts for a given time interval. In addition, current solutions are limited by depending on finding a common source for the attack. However, in more sophisticated attacks, such as, for example, an advanced persistent threat, the attacker may choose to go "slow and low" to avoid detection by spacing out the time and source of attacks.

Illustrative embodiments overcome the shortcomings of current solutions by focusing on the target of an attack rather than the source of the attack. Illustrative embodiments maintain a list of all failed passwords that are attempted across all user accounts on a target system to determine whether a same password is used in failed login attempts across a specified number of accounts. When illustrative embodiments determine that the same password is used in failed login attempts across the specified number of accounts, illustrative embodiments send an alert to a security or system analyst for review and possible action. Further, illustrative embodiments can perform one or more countermeasures, such as, for example, disabling the user accounts under attack, disabling user accounts having the same failed password, blocking future login attempts from the source system, and sending an alert to a security administrator for subsequent follow up.

For each failed login attempt on the target system regardless of user account, illustrative embodiments save the password (or a hash of the password to increase password security) in a list of failed passwords. In addition, illustrative embodiments record the number of login attempts to the target system using that password or hash, along with a timestamp of the most recent login attempt using that password or hash, the identifier of the account attempted to be accessed using that password or hash, and the Internet Protocol (IP) address of the source system. However, it should be noted that illustrative embodiments may discard some of this information if available storage space is an issue and illustrative embodiments determine that the information is not critical for security analysis. If illustrative embodiments determine that the same failed password was attempted across more than the specified number of accounts within a specified period of time, illustrative embodiments send an alert, optionally block login attempts from that source system, and possibly disable all user accounts associated with the password spaying attack. The specified number of accounts within the specified period of time may be, for example, five user accounts within a one-hour period of time using the same incorrect password. However, it should be noted that the specified number of accounts and specified period of time are configurable by a security or system analyst.

Illustrative embodiments scrutinize only failed login attempts so as to minimize the risk of locking out legitimate users who have successfully logged in to accounts on the target system using the same password, but illustrative embodiments may send an alert regarding the reuse of that password for investigation by a security analyst. However, it should be noted that illustrative embodiments do not record passwords associated with successful account logins. Further, illustrative embodiments not only block the current failed login attempt, but also block all future login attempts from the IP address of the source system for a configurable period of time, such as, for example, one hour, two hours, three hours, six hours, one day, or any other specified period of time. Furthermore, illustrative embodiments may utilize a time decay function for removing a password from the list of failed passwords after expiration of a specified period of time, such as, for example, one hour, one day, one week, or the like, since that password was last used. Moreover, illustrative embodiments determine whether a configurable number of failed attempts using that same password has been exceeded prior to sending an alert or taking corrective action.

Thus, illustrative embodiments provide one or more technical solutions that overcome a technical problem with detecting and defending against password spraying attacks on a target system of a network. As a result, these one or more technical solutions provide a technical effect and practical application in the field of network security.

Figure 3A:
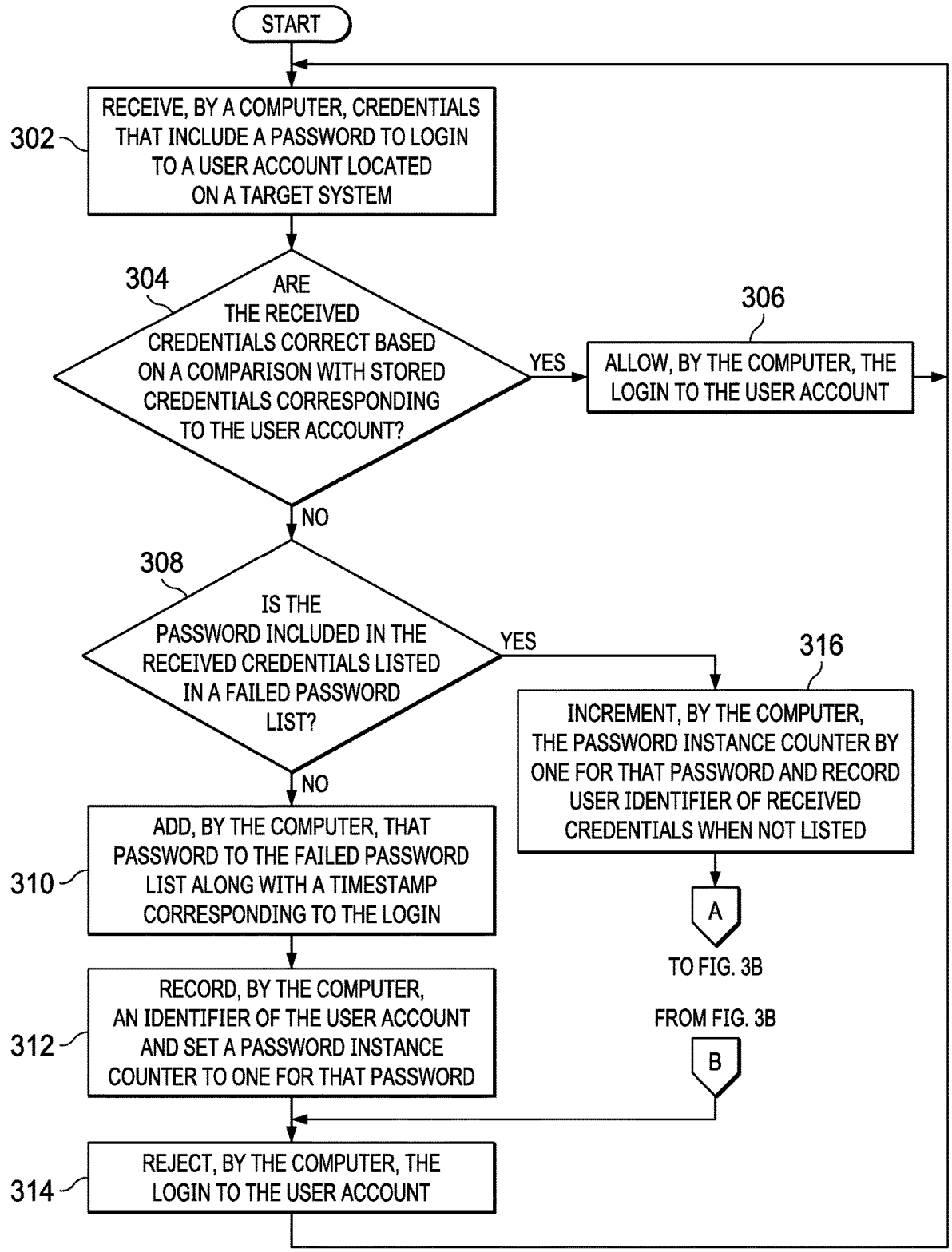
FIGS. 3A-3B are a flowchart illustrating a process for determining whether to allow access to a user account on a target system in accordance with an illustrative embodiment.
Figure 3B:
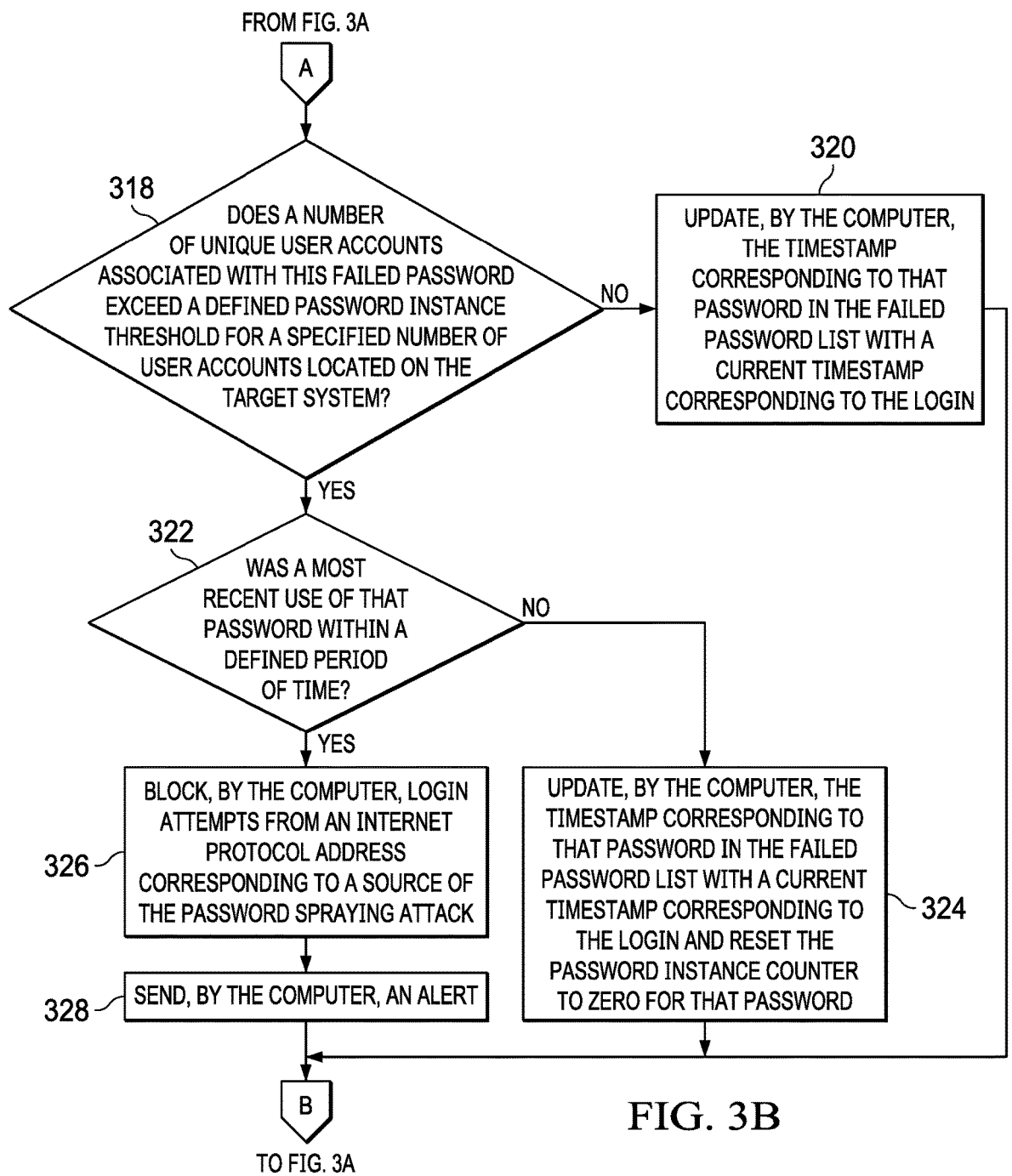

With reference now to FIGS. 3A-3B, a flowchart illustrating a process for determining whether to allow access to a user account on a target system is shown in accordance with an illustrative embodiment. The process shown in FIGS. 3A-3B may be implemented in a computer, such as, for example, server 104 in FIG. 1 or data processing system 200 in FIG. 2.

The process begins when the computer receives credentials that include a password to login to a user account located on the target system (step 302). In response to receiving the credentials that include a password to login to a user account located on the target system in step 302, the computer makes a determination as to whether the received credentials are correct based on a comparison with stored credentials corresponding to the user account (step 304). If the computer determines that the received credentials are correct based on the comparison with the stored credentials corresponding to the user account, yes output of step 304, then the computer allows the login to the user account (step 306). Thereafter, the process returns to step 302 where the computer continues to receive credentials to login to user accounts located on the target system.

If the computer determines that the received credentials are incorrect based on the comparison with the stored credentials corresponding to the user account, no output of step 304, then the computer makes a determination as to whether the password included in the received credentials is listed in a failed password list (step 308). If the computer determines that the password included in the received credentials is not listed in the failed password list, no output of step 308, then the computer adds that password to the failed password list along with a timestamp corresponding to the login (step 310). In addition, the computer records an identifier, such as a name, of the user account and sets a password instance counter to one for that password (step 312). Further, the computer rejects the login to the user account (step 314). Thereafter, the process returns to step 302 where the computer continues to receive credentials to login to user accounts located on the target system.

Returning again to step 308, if the computer determines that the password included in the received credentials is listed in the failed password list, yes output of step 308, then the computer increments the password instance counter by one for that password and records a user identifier of the received credentials when not already listed (step 316). The computer also makes a determination as to whether a number of unique user accounts associated with this failed password exceeds a defined password instance threshold for a specified number of user accounts located on the target system (step 318). If the computer determines that the number of unique user accounts associated with this failed password does not exceed the defined password instance threshold for the specified number of user accounts located on the target system, no output of step 318, then the computer updates the timestamp corresponding to that password in the failed password list with a current timestamp corresponding to the login (step 320). Thereafter, the process returns to step 314 where the computer rejects the login to the user account.

If the computer determines that the number of unique user accounts associated with this failed password does exceed the defined password instance threshold for the specified number of user accounts located on the target system, yes output of step 318, then the computer makes a determination as to whether a most recent use of that password was within a defined period of time (step 322). If the computer determines that the most recent use of that password was not within the defined period of time, no output of step 322, then the computer updates the timestamp corresponding to that password in the failed password list with a current timestamp corresponding to the login and resets the password instance counter to zero for that password (step 324). Thereafter, the process returns to step 314 where the computer rejects the login to the user account.

If the computer determines that the most recent use of that password was within the defined period of time, yes output of step 322, then the computer determines that a password spraying attack is occurring and blocks login attempts from an internet protocol address corresponding to a source of the password spraying attack (step 326). Moreover, the computer sends an alert (step 328). Thereafter, the process returns to step 314 where the computer rejects the login to the user account.

Figure 4:
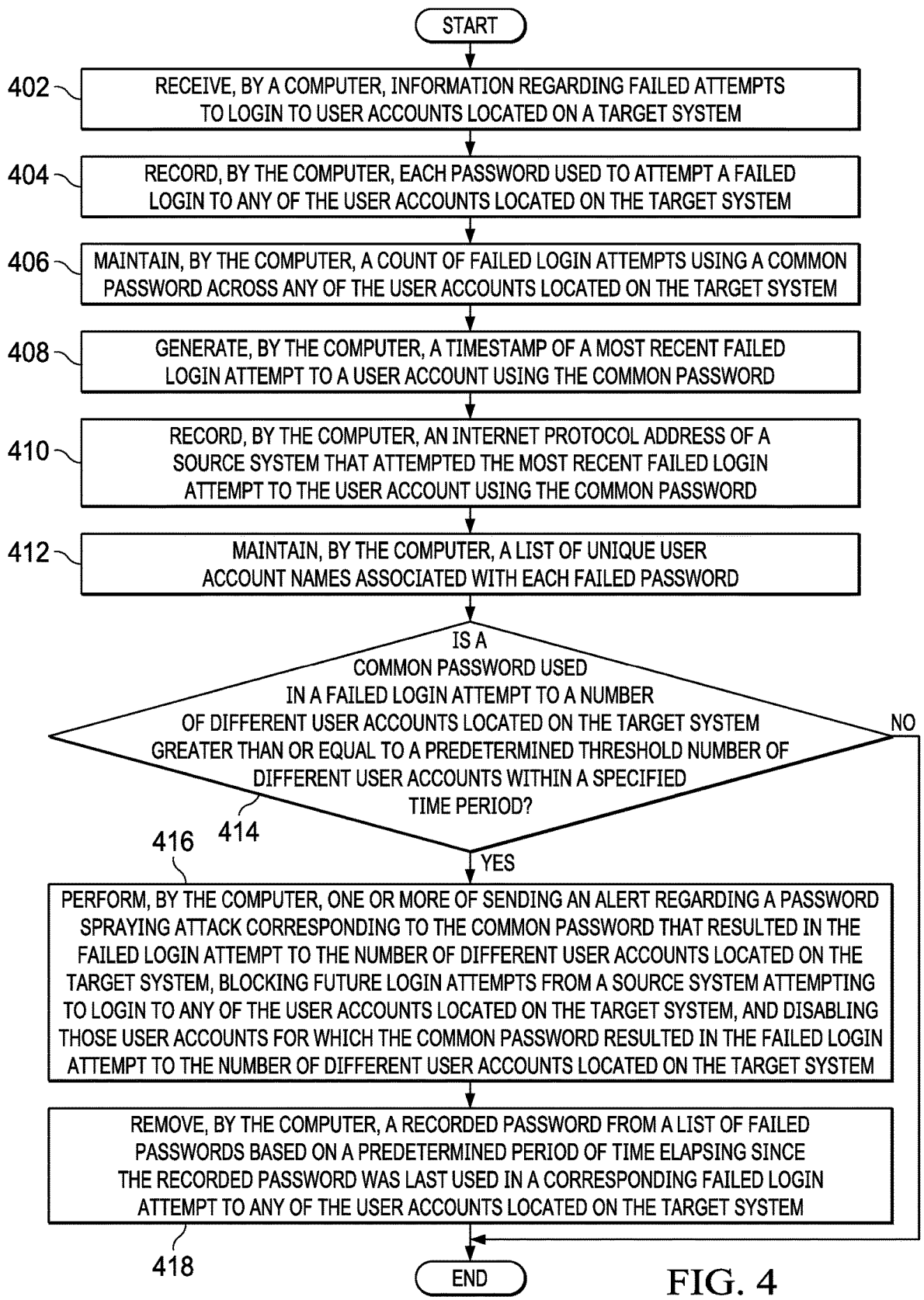
FIG. 4 is a flowchart illustrating a process for detecting and defending against password spraying attacks in accordance with an illustrative embodiment.

With reference now to FIG. 4, a flowchart illustrating a process for detecting and defending against password spraying attacks on a network is shown in accordance with an illustrative embodiment. The process shown in FIG. 4 may be implemented in a computer, such as, for example, server 104 in FIG. 1 or data processing system 200 in FIG. 2.

The process begins when the computer receives information regarding failed attempts to login to user accounts located on a target system of the network (step 402). The computer records each password used to attempt a failed login to any of the user accounts located on the target system (step 404).

In addition, the computer maintains a count of failed login attempts using a common password across any of the user accounts located on the target system (step 406). Further, the computer generates a timestamp of a most recent failed login attempt to a user account using the common password (step 408). The computer also records an internet protocol address of a source system that attempted the most recent failed login attempt to the user account using the common password (step 410). The computer further maintains a list of unique user account names associated with each failed password (step 412).

The computer makes a determination as to whether a common password is used in a failed login attempt to a number of different user accounts located on the target system greater than or equal to a predetermined threshold number of different user accounts within a specified time period (step 414). If the computer determines that a common password is not used in the failed login attempt to the number of different user accounts located on the target system greater than or equal to the predetermined threshold number of different user accounts within the specified time period, no output of step 414, then the process terminates thereafter.

If the computer determines that a common password is used in the failed login attempt to the number of different user accounts located on the target system greater than or equal to the predetermined threshold number of different user accounts within the specified time period, yes output of step 414, then the computer performs one or more of sending an alert regarding a password spraying attack corresponding to the common password that resulted in the failed login attempt to the number of different user accounts located on the target system, blocking future login attempts from a source system attempting to login to any of the user accounts located on the target system, and disabling those user accounts for which the common password resulted in the failed login attempt to the number of different user accounts located on the target system (step 416). Alternatively, the computer disables all user accounts having that same password. The computer also removes a recorded password from a list of failed passwords based on a predetermined period of time elapsing since the recorded password was last used in a corresponding failed login attempt to any of the user accounts located on the target system (step 418). Thereafter, the process terminates.

Thus, illustrative embodiments of the present invention provide a computer-implemented method, computer system, and computer program product for detecting and defending against password spraying attacks on a network. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A method for detecting and defending against password spraying attacks on a network, the method comprising:
receiving information regarding failed attempts to login to user accounts located on a target system of the network;
recording each password used to attempt a failed login to any of the user accounts located on the target system;
determining whether a common password is used in a failed login attempt to a number of different user accounts located on the target system greater than or equal to a predetermined threshold; and responsive to determining that the common password was used in the failed login attempt to the number of different user accounts on the target system greater than or equal to the predetermined threshold, sending an alert regarding a password spraying attack corresponding to the common password that resulted in the failed login attempt to the number of different user accounts located on the target system, disabling those user accounts for which the common password resulted in the failed login attempt to the number of different user accounts located on the target system, and disabling all other user accounts located on the target system having a same password as the common password that resulted in the failed login attempt to the number of different user accounts located on the target system.

2. The method of claim 1 further comprising:
responsive to determining that the common password was used in the failed login attempt to the number of different user accounts on the target system greater than or equal to the predetermined threshold, blocking future login attempts from a source system attempting to login to any of the user accounts located on the target system.

3. The method of claim 1, wherein the recording of each password used to login to any of the user accounts located on the target system further includes:
maintaining a count of failed login attempts using the common password across any of the user accounts located on the target system;
generating a timestamp for a most recent login attempt to a user account using the common password;
recording an IP address of a source system that attempted the most recent login attempt to the user account using the common password; and
maintaining a list of unique user account names associated with each failed password.

4. The method of claim 1 further comprising:
saving each password used to attempt the failed login to any of the user accounts located on the target system in a list of failed passwords along with a timestamp corresponding to each respective failed login;
incrementing a password instance counter by one for each same password used to attempt the failed login to any of the user accounts located on the target system;
determining whether a most recent use of the common password used in the failed login attempt to the number of different user accounts was within a defined period of time; and
responsive to determining that the most recent use of the common password used in the failed login attempt to the number of different user accounts was not within the defined period of time, resetting the password instance counter to zero for that common password.

5. The method of claim 4, wherein each password is saved as a hash in the list of failed passwords to increase password security.

6. The method of claim 4 further comprising:
removing a recorded password from the list of failed passwords based on a predetermined period of time elapsing since the recorded password was last used in a corresponding failed login attempt to any of the user accounts located on the target system.

7. The method of claim 1, wherein the predetermined threshold is a predetermined threshold number of different user accounts within a specified period of time.

8. A computer system for detecting and defending against password spraying attacks on a network, the computer system comprising:
a bus system;
a storage device connected to the bus system, wherein the storage device stores program instructions; and
a processor connected to the bus system, wherein the processor executes the program instructions to:
receive information regarding failed attempts to login to user accounts located on a target system of the network;
record each password used to attempt a failed login to any of the user accounts located on the target system;
determine whether a common password is used in a failed login attempt to a number of different user accounts located on the target system greater than or equal to a predetermined threshold; and
send an alert regarding a password spraying attack corresponding to the common password that resulted in the failed login attempt to the number of different user accounts located on the target system in response to determining that the common password was used in the failed login attempt to the number of different user accounts on the target system greater than or equal to the predetermined threshold, disable those user accounts for which the common password resulted in the failed login attempt to the number of different user accounts located on the target system, and disable all other user accounts located on the target system having a same password as the common password that resulted in the failed login attempt to the number of different user accounts located on the target system.

9. The computer system of claim 8, wherein the processor further executes the program instructions to:
block future login attempts from a source system attempting to login to any of the user accounts located on the target system in response to determining that the common password was used in the failed login attempt to the number of different user accounts on the target system greater than or equal to the predetermined threshold.

10. A computer program product for detecting and defending against password spraying attacks on a network, the computer program product comprising a computer readable storage medium having program instructions embodied therewith, the program instructions executable by a computer to cause the computer to perform a method comprising:
receiving information regarding failed attempts to login to user accounts located on a target system of the network;
recording each password used to attempt a failed login to any of the user accounts located on the target system;
determining whether a common password is used in a failed login attempt to a number of different user accounts located on the target system greater than or equal to a predetermined threshold; and
responsive to determining that the common password was used in the failed login attempt to the number of different user accounts on the target system greater than or equal to the predetermined threshold, sending an alert regarding a password spraying attack corresponding to the common password that resulted in the failed login attempt to the number of different user accounts located on the target system, disabling those user accounts for which the common password resulted in the failed login attempt to the number of different user accounts located on the target system, and disabling all other user accounts located on the target system having a same password as the common password that resulted in the failed login attempt to the number of different user accounts located on the target system.

11. The computer program product of claim 10 further comprising:
responsive to determining that the common password was used in the failed login attempt to the number of different user accounts on the target system greater than or equal to the predetermined threshold, blocking future login attempts from a source system attempting to login to any of the user accounts located on the target system.

12. The computer program product of claim 10, wherein the recording of each password used to login to any of the user accounts located on the target system further includes:
maintaining a count of failed login attempts using the common password across any of the user accounts located on the target system;
generating a timestamp for a most recent login attempt to a user account using the common password;
recording an IP address of a source system that attempted the most recent login attempt to the user account using the common password; and
maintaining a list of unique user account names associated with each failed password.

13. The computer program product of claim 10 further comprising:
saving each password used to attempt the failed login to any of the user accounts located on the target system in a list of failed passwords along with a timestamp corresponding to each respective failed login;
incrementing a password instance counter by one for each same password used to attempt the failed login to any of the user accounts located on the target system;
determining whether a most recent use of the common password used in the failed login attempt to the number of different user accounts was within a defined period of time; and
responsive to determining that the most recent use of the common password used in the failed login attempt to the number of different user accounts was not within the defined period of time, resetting the password instance counter to zero for that common password.

14. The computer program product of claim 13, wherein each password is saved as a hash in the list of failed passwords to increase password security.

* * * * *